(12) United States Patent
Zhou et al.

(10) Patent No.: US 10,748,334 B2
(45) Date of Patent: Aug. 18, 2020

(54) METHOD AND APPARATUS FOR FUSING POINT CLOUD DATA

(71) Applicant: Baidu Online Network Technology (Beijing) Co., Ltd., Haidan District, Beijing (CN)

(72) Inventors: Wang Zhou, Beijing (CN); Miao Yan, Beijing (CN); Yifei Zhan, Beijing (CN); Xiong Duan, Beijing (CN); Changjie Ma, Beijing (CN); Xianpeng Lang, Beijing (CN); Yonggang Jin, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/232,721

(22) Filed: Dec. 26, 2018

(65) Prior Publication Data

US 2019/0206123 A1 Jul. 4, 2019

(30) Foreign Application Priority Data

Dec. 29, 2017 (CN) .......................... 2017 1 1483869

(51) Int. Cl.
| | |
|---|---|
| *G06T 17/05* | (2011.01) |
| *G06T 7/30* | (2017.01) |
| *G06T 7/73* | (2017.01) |
| *G06T 7/246* | (2017.01) |

(52) U.S. Cl.
CPC .............. *G06T 17/05* (2013.01); *G06T 7/248* (2017.01); *G06T 7/30* (2017.01); *G06T 7/74* (2017.01); *G06T 2200/04* (2013.01); *G06T 2207/10028* (2013.01); *G06T 2207/20221* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 9,286,538 B1 * | 3/2016 | Chen | ............... G06K 9/00208 |
| 2014/0152660 A1 | 6/2014 | Lee | |

OTHER PUBLICATIONS

Sarvrood, Y., Hosseinyalamdary, S., Gao, Y., Visual-LIDAR Odometry Aided by Reduced IMU, Jan. 2016, ISPRS Int. Journal Geo-Information 2016, pp. 1-24. (Year: 2016).*

(Continued)

*Primary Examiner* — Said Broome
(74) *Attorney, Agent, or Firm* — Knobbe, Martens, Olson & Bear, LLP

(57) ABSTRACT

A method and apparatus for fusing point cloud data, and a computer readable storage medium are provided. Some embodiments of the method can include: acquiring a first image and a second image, the first image and the second image being respectively associated with a first frame of point cloud data and a second frame of point cloud data acquired for a given scene; determining a point cloud movement matrix between the first frame of point cloud data and the second frame of point cloud data on the basis of the first image and the second image; and fusing the first frame of point cloud data with the second frame of point cloud data on the basis of the point cloud movement matrix.

15 Claims, 8 Drawing Sheets

(56) References Cited

OTHER PUBLICATIONS

Naikal, et al., "Image Augmented Laser Scan Matching for Indoor Dead Reckoning," 2009 IEEE/RSJ International Conference on Intelligent Robots and Systems, Oct. 22-15, 2009, 4134-4141.
Sarvrood, et al., "Visual-LiDAR Odometry Aided by Reduced IMU," ISPRS Int. J. Geo-Inf. 2016, 5, 3, 24 pages.
Fox, et al., "An approach to stereo-point cloud registration using image homographies," Intelligent Robots and Computer Vision: Algorithms and Techniques, edited by Juha Roning, Proc. of SPIE-IS&T Electronic Imaging, SPIE vol. 8301, 2012, 6 pages.
Zacherl, et al., "An Automated Method for Registering Lidar Data in Restrictive Tunnel-like Environments," Proc. of SPIE vol. 9832, 2016, 20 pages.

* cited by examiner

METHOD AND APPARATUS FOR FUSING POINT CLOUD DATA

CROSS-REFERENCE TO RELATED APPLICATIONS

This application claims priority to Chinese Patent Application no. 201711483869.6, filed in China on Dec. 29, 2017, the contents of which are incorporated herein by reference in their entirety.

TECHNICAL FIELD

Embodiments of the present disclosure mainly relate to a method and apparatus for fusing point cloud data, and specifically to a method and apparatus for fusing point cloud data for a high-precision map.

BACKGROUND

The point cloud fusion technology is essential to the three-dimensional reconstruction of a scene. In particular, in the process of constructing the three-dimensional model for a high-precision map, the point cloud fusion is one of the most important technologies determining whether the construction of the three-dimensional model is successful. In the technique of fusing point cloud data, the position and orientation determination is generally performed on the point cloud data measured by an acquisition entity from different viewing angles, thereby unifying the point cloud data into a global coordinate system. The fused point cloud data can facilitate the subsequent three-dimensional reconstruction of the scene.

The traditional solution of fusing the point cloud data generally includes extracting point cloud characteristics, matching the point clouds, and fusing the point clouds. However, for special cases, for example, in an unstructured scene like a tunnel, sufficient point cloud characteristics cannot be extracted, and at the same time there is no position information (e.g., no GPS information). Therefore, the position and orientation determination cannot be performed on the acquired point cloud data. Thus, it is difficult to successfully perform the point cloud fusion, and then, the three-dimensional reconstruction of the scene cannot be further effectively achieved on the basis of the point cloud fusion.

SUMMARY

According to illustrative embodiments of the present disclosure, a method and apparatus for fusing point cloud data are provided, such that the point cloud fusion can be successfully performed even in an unstructured scene and an environment where the quality of a position signal or the quality of an inertial navigation signal is poor.

In a first aspect, the present disclosure provides a method for fusing point cloud data. The method includes: acquiring a first image and a second image, the first image and the second image being respectively associated with a first frame of point cloud data and a second frame of point cloud data acquired for a given scene; determining a point cloud movement matrix between the first frame of point cloud data and the second frame of point cloud data on the basis of the first image and the second image; and fusing the first frame of point cloud data with the second frame of point cloud data on the basis of the point cloud movement matrix.

In a second aspect, the present disclosure provides an apparatus for fusing point cloud data. The apparatus includes: an image acquisition module, configured to acquire a first image and a second image, the first image and the second image being respectively associated with a first frame of point cloud data and a second frame of point cloud data acquired for a given scene; a movement matrix determination module, configured to determine a point cloud movement matrix between the first frame of point cloud data and the second frame of point cloud data on the basis of the first image and the second image; and a point cloud fusion module, configured to fuse the first frame of point cloud data with the second frame of point cloud data on the basis of the point cloud movement matrix.

In a third aspect, the present disclosure provides a device. The device includes one or more processors; and a storage device, configured to store one or more programs. The one or more programs, when executed by the one or more processors, cause the one or more processors to implement the method according to the first aspect of the present disclosure.

In a fourth aspect, the present disclosure provides a computer readable storage medium storing a computer program. The program, when executed by a processor, implements the method according to the first aspect of the present disclosure.

It should be understood that the contents described in the present disclosure are not intended to limit the crucial or essential features of some embodiments of the present disclosure, and not used to limit the scope of the present disclosure. Other features of the present disclosure will be easily understood through the following descriptions.

BRIEF DESCRIPTION OF THE DRAWINGS

The above and other features, advantages, and aspects of some embodiments of the present disclosure will become more apparent in combination with the accompanying drawings and with reference to the following detailed descriptions. In the accompanying drawings, the same or similar reference numerals represent the same or similar elements.

DETAILED DESCRIPTION OF EMBODIMENTS

Figure 1:
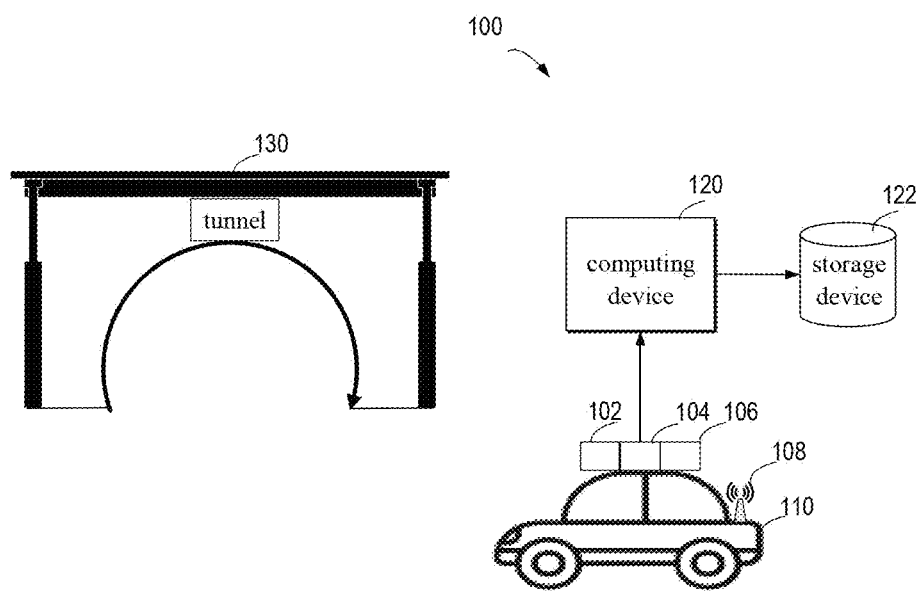
FIG. 1 illustrates a schematic diagram of an illustrative environment 100 in which a plurality of embodiments of the present disclosure can be implemented.

The embodiments of the present disclosure will be described in more detail below with reference to the accompanying drawings. Some embodiments of the present disclosure are shown in the accompanying drawings. However, it should be appreciated that the present disclosure may be implemented in various forms, and should not be interpreted as being limited by the embodiments described herein. Conversely, the embodiments are provided for a more thorough and complete understanding for the present disclosure. It should be understood that the accompanying drawings and embodiments in the present disclosure are only illustrative, and not used to limit the scope of protection of the present disclosure.

In the description for the embodiments of the present disclosure, the term "comprising" and similar terms thereof should be understood as open-ended (i.e., "including, but not limited to"). The term "on the basis of" should be understood as "at least partially on the basis of." The term "an embodiment," "the embodiments," or "the embodiment" should be understood as "at least one embodiment." The terms such as "first" and "second" may refer to different or identical objects. Hereinafter, other explicit and implicit definitions may also be included.

As used herein, the term "scene" may be either moving or stationary, either indoor or outdoor. The term "acquisition entity" may be, but not limited to, a driving system. The driving system may include an autonomous driving system or a non-autonomous driving system. Hereinafter, some embodiments of the present disclosure are discussed by taking the acquisition vehicle as an example. However, it should be understood that the solution of the present disclosure may be similarly applied to other types of acquisition entities.

As mentioned above, the existing solutions of fusing the point cloud data include: performing the point cloud fusion directly by performing the characteristic matching on point clouds of the ladar, performing the point cloud fusion using an expensive inertial measurement unit (IMU) or global positioning system (GPS), performing the point cloud fusion by directly using a kinect camera, and so on. As shown in the researches, all the solutions have obvious drawbacks.

Specifically, for the traditional method for fusing directly on the basis of the characteristic matching on the point clouds, abundant point cloud characteristics are only easily acquired in the structured scene, and there are few point cloud characteristics in the unstructured scene (e.g., the highway). Therefore, it is easily caused that the matching cannot be performed on the adjacent frames of point cloud data on the basis of the point cloud characteristics, and then it is difficult to successfully perform the point cloud data positioning, so that the point cloud fusion cannot be successfully performed.

The traditional method for performing the point cloud fusion on the basis of the IMU or GPS can acquire a good point cloud fusion effect in most cases. However, for special scenes with occlusion (e.g., a city having high-rise buildings, and a densely wooded environment), the quality of the GPS signal is poor, and even in some scenes (e.g., in the tunnels and buildings) there is no GPS signal. In the scenes where the quality of the GPS signal is poor, the outputted position and orientation result is inaccurate, which leads to the failure of the point cloud fusion.

For the traditional method for performing the point cloud fusion by directly using the images of the kinect camera, since the point cloud data acquired by the kinect camera is sparse and the accuracy thereof is not enough, the fusion effect is not good.

It may be seen that when the signal quality at the acquisition position is poor and the scene is the unstructured environment, the needs for the high-precision point cloud fusion cannot be satisfied on the basis of the IMU or by deriving the positions and orientations of two frames of point cloud data using the point cloud matching.

According to some embodiments of the present disclosure, a solution for fusing point cloud data is proposed. According to the solution, when the quality of the position signal or the quality of the inertial navigation signal is poor and the scene is the unstructured environment, the movement matrix between an early frame of point cloud data and a late frame of point cloud data acquired at the associated moments (referred to as "point cloud movement matrix" hereinafter) is calculated on the basis of the characteristic matching on the images acquired for the scene at the early acquisition moment and the late acquisition moment. Then, the point cloud fusion is performed on the early frame of point cloud data and the late frame of point cloud data. Specifically, in the case where the quality of the position signal or the inertial navigation signal is poor, the characteristic matching on the images may be performed using relatively clear texture characteristics or color characteristics in the images acquired by the camera. Accordingly, the movement matrix between the early image and the late image (referred to as "image movement matrix" hereinafter) may be determined. Then, the point cloud movement matrix between the associated early frame of point cloud data and late frame of point cloud data may be determined, and then the point cloud fusion is performed. By adopting the solution of performing the point cloud fusion with the aid of images, the point cloud fusion can be successfully completed even in the unstructured environment where the quality of the position signal is poor (e.g., the tunnel). In this way, the failure of the point cloud fusion is effectively avoided, and the success probability of the point cloud fusion is improved.

The provided solution of fusing the point cloud data further includes: determining the point cloud movement matrix between the early frame of point cloud data and the late frame of point cloud data on the basis of the inertial navigation signal, or determining the point cloud movement matrix between the early frame of point cloud data and the late frame of point cloud data directly on the basis of the characteristic matching on the early frame of point cloud data and the late frame of point cloud data, when the quality of the position signal and the quality of the inertial navigation signal are higher than a predefined value, or the scene is the structured environment; and then performing the point cloud fusion. In the above solution, when the quality of the position signal is recovered and when returning to the structured scene, the method for fusing with the aid of the inertial navigation or the method for fusing directly on the basis of the point cloud matching is used. Accordingly, it is possible to determine, in the situation where the position signal and the environment satisfy the predetermined condition, the position and orientation of the point cloud data by taking full advantage of the inertial navigation and the high-accuracy measurement data of the ladar, so as to improve the effect of the point cloud fusion.

Some embodiments of the present disclosure will be specifically described below with reference to the accompanying drawings.

FIG. 1 illustrates a schematic diagram of an illustrative environment 100 in which a plurality of embodiments of the present disclosure can be implemented. In the illustrative environment 100, point cloud data is fused by the computing device 120, and thus the three-dimensional reconstruction of a scene is realized.

In some embodiments of the present disclosure, an acquisition entity for acquiring the point cloud data may be any entity having a capability of acquiring the point cloud, for example, a mobile equipment, or a vehicle. At the same time, the acquisition entity may also be any entity that integrates or carries a device having a capability of acquiring the point cloud data. It should be understood that the acquisition entity may transmit the point cloud data to the computing device 120 in any data transmission form such as a wired or wireless data transmission. Such transmission need not be a real-time transmission. The time or form for transmitting the point cloud data to the computing device 120 does not affect the subsequent processing of the computing device on the point cloud data. In the embodiment of FIG. 1, the acquisition entity is illustrated as the acquisition vehicle 110. It should be understood that this is merely for an illustrative purpose and rather than a limitation.

The computing device 120 may perform a point cloud fusion on the basis of a plurality of frames of point cloud data that are obtained. The computing device 120 may be disposed on the acquisition vehicle 110. The computing device may also be disposed remotely to the vehicle and perform a signal interaction with the acquisition vehicle 110 by means of a wireless communication.

The acquisition vehicle 110 is provided with the ladar 102, the stereo camera 104, the inertial navigation measuring unit 106, and the GPS signal receiving device 108, respectively. The ladar 102 is used to acquire the point cloud data of the scene 130 at a given acquisition frequency. For example, in some embodiments, the acquisition frequency of the ladar 102 is 10 Hz (i.e., 10 frames of point cloud data are acquired per second). The stereo camera 104 is used to acquire the stereoscopic image of the scene 130 at a given frequency (e.g., 8 Hz). The inertial navigation measuring unit 106 is used to measure the triaxial orientation angle (or angular rate) and the acceleration of the acquisition vehicle 110. The inertial navigation measuring unit 106 generally includes three uniaxial accelerometers and three uniaxial gyroscopes, and the frequency of the output signal of the inertial navigation measuring unit 106 is within, for example, 20 Hz-50 Hz. The GPS signal receiving device 108 is used to receive the global positioning system satellite signal and determine the space position of the acquisition vehicle 110. In some embodiments, the ladar 102, the stereo camera 104, and the inertial navigation measuring unit 106 are disposed on the acquisition vehicle 110 in a relatively fixed way, and thus the movement matrix between any two of the above three sensors (also referred to as "position and orientation movement matrix" hereinafter) may be preset. If the position and orientation of any of the sensors is obtained at a given moment, the corresponding positions and orientations of the other two sensors at the associated moment may be derived via the position and orientation movement matrix between any two of the sensors. In some embodiments, before the acquisition vehicle 110 begins the acquisition, the initial positions of the ladar 102, the stereo camera 104, and the inertial navigation measuring unit 106 in the world coordinate system may be pre-marked. For example, the position and orientation movement matrix from the stereo camera 104 to the ladar 102 is $T_{c-1}$ (the position and orientation movement matrix $T_{c-1}$ may be manually pre-calibrated, or may be determined during measuring). When the position and orientation of the camera corresponding to a given frame of ladar are, for example, $P_{cam}$, it may be determined that the position and orientation of the ladar at the associated moment are $P_{lidar}=T_{c-1} \cdot P_{cam}$. In some embodiments, the separated GPS receiving device and inertial navigation measuring unit may be replaced by an integrated inertial navigation device such as a SPAN-CPT integrated navigation and positioning system in which the GPS receiving device and the inertial measuring unit are tightly coupled.

The signals acquired or outputted by the ladar 102, the stereo camera 104, the inertial navigation measuring unit 106, and the GPS signal receiving device 108 may be provided to the computing device 120 in a wired or wireless manner. The calculation result of the computing device 120, for example, a point cloud fusion result, a three-dimensional scene based on the point cloud fusion, or a high-precision map may be stored in the storage device 122.

The scene 130 may be within a building (e.g., an underground garage), or may be any open space, for example, a highway, a city block, an overpass, and a tunnel. As shown in FIG. 1, the scene is the tunnel.

Figure 2:
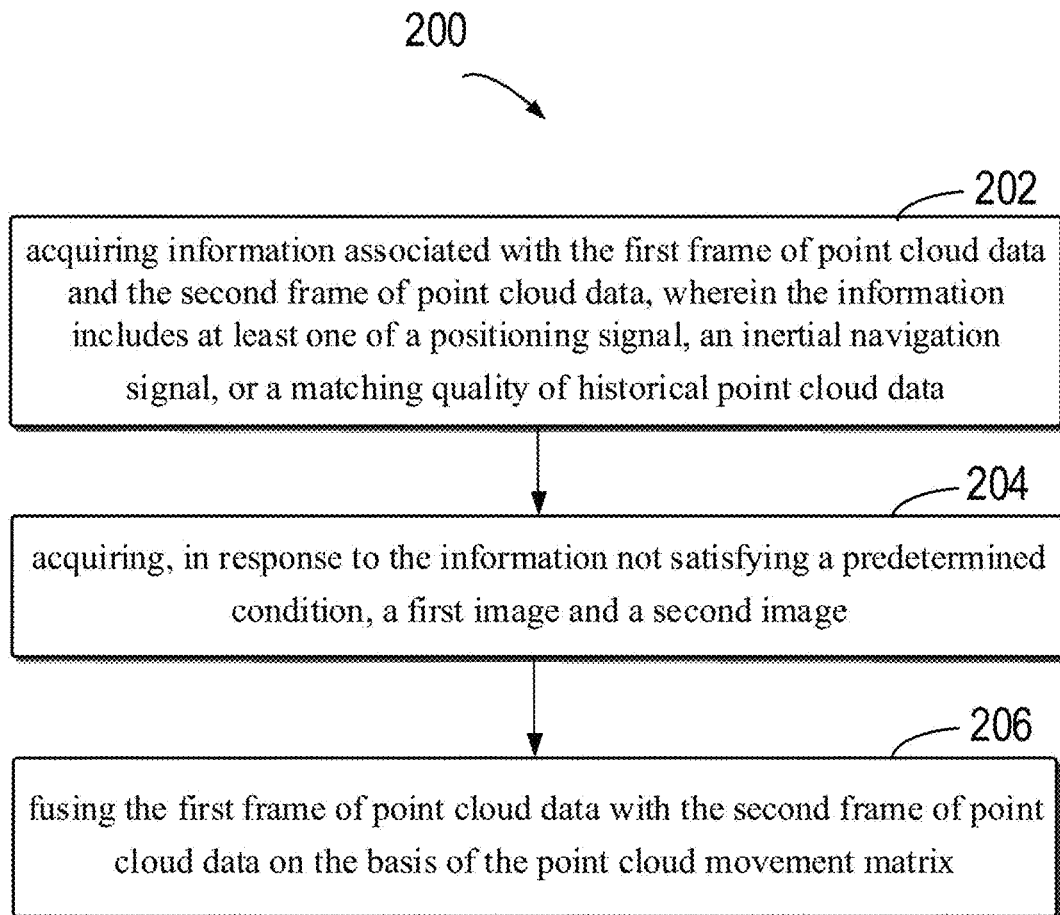
FIG. 2 illustrates a flowchart of a method 200 for fusing point cloud data according to some embodiments of the present disclosure.
Figure 3:
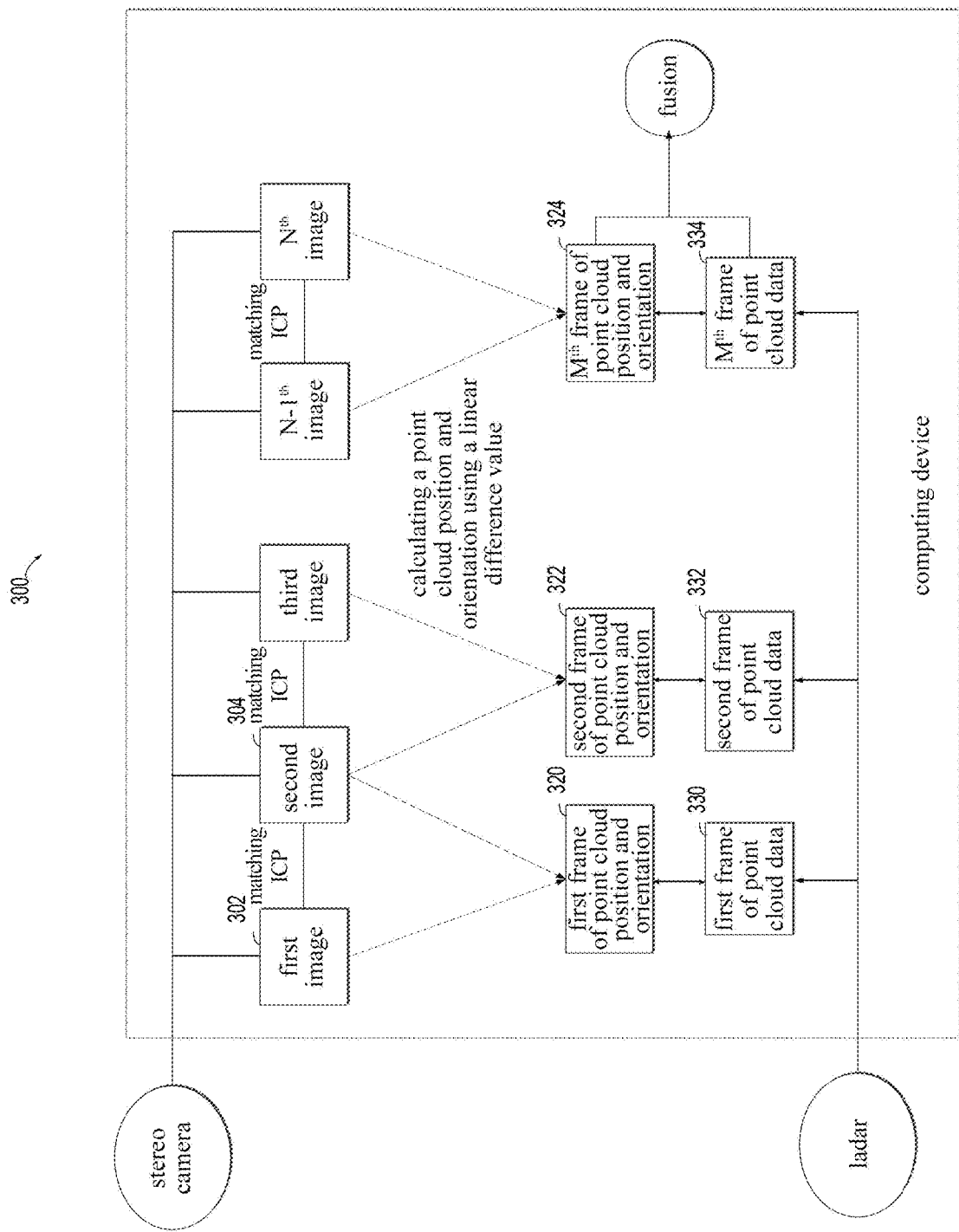
FIG. 3 illustrates a schematic diagram of a process 300 for fusing point cloud data with the aid of images according to some embodiments of the present disclosure.

FIG. 2 illustrates a flowchart of a method 200 for fusing point cloud data according to some embodiments of the present disclosure. The method 200 may be implemented by the computing device 120. FIG. 3 illustrates a schematic diagram of a process 300 for fusing point cloud data with the aid of images according to some embodiments of the present disclosure. For clarity, the contents of the method 200 will be specifically described below in combination with FIG. 3.

At 202, the computing device acquires the first image 302 and the second image 304. The first image 302 and the second image 304 are associated with first frame of point cloud data and second frame of point cloud data that are acquired for the identical scene 130, respectively. In some embodiments, the association is that, for example, the acquisition moments of the first image 302 and the second image 304 are closest to the acquisition moments of the first frame of point cloud data and the second frame of point cloud data. Thereby, the positions and orientations 306 and 308 at the acquisition moments of the first frame of point cloud data and the second frame of point cloud data may be calculated on the basis of the camera positions and orientations at the acquisition moments of the first image 302 and the second image 304.

In some embodiments, acquiring the first image and the second image includes: acquiring the information associated with the first frame of point cloud data and the second frame of point cloud data, the information including at least one of a positioning signal, an inertial navigation signal, or the matching quality of historical point cloud data; and acquiring the first image and the second image in response to the information not satisfying a predetermined condition. In some embodiments, if the quality of the acquired positioning signal is lower than a first threshold quality or the quality of the inertial navigation signal is lower than a second threshold quality, and the matching quality of the historical point cloud data is lower than a third threshold quality, the first image and the second image are acquired.

In some embodiments, the cases that the quality of the acquired positioning signal is lower than the first threshold quality or the quality of the acquired inertial navigation signal is lower than the second threshold quality includes.

For example, if the quality identifier of the GPS signal is lower than a set value, it is considered that the GPS signal has a poor quality and the information of the corresponding measurement position is not accurate enough, so that the effective point cloud fusion can not be performed on the basis of the positions and orientations of the first frame of point cloud data and the second frame of point cloud data derived from the GPS signal and the inertial navigation signal. In some embodiments, for example, when the SPAN-CPT integrated navigation and positioning system is used, the Q value in the system is an identifier for representing the quality of the GPS signal, which is a value calculated by combining factors affecting the GPS signal such as the number of the received satellite signals, the signal strengths of the received satellite signals, and the signal to noise ratios of the received satellite signals. The value may be taken from one to six, and each value represents a different GPS signal quality level. For example, the value of one indicates that the quality of the GPS signal is the best, and the value of six indicates that the quality of the GPS signal is the worst. For example, in the scenes of indoor, canyon, forest, tunnel, etc., the GPS signal will be obstructed and weakened. In such case, the Q value is lower than a preset first threshold, for example, two. In some embodiments, by taking a threshold of one or two for Q, a more ideal point cloud fusion effect may be obtained.

In some embodiments, the cases that the matching quality of the historical point cloud data is lower than the third threshold quality include, for example, two frames of point cloud data are pre-acquired to extract some characteristics, for example, corner points, and characteristics having special curvatures; then, the matching is performed on the two frames of point cloud data on the basis of the extracted characteristics, and an estimation is performed according to the matching quality; when the matching quality of the point cloud data is lower than the preset third threshold quality, it is determined that the matching quality of the historical point cloud data does not satisfy the preset condition. That is, in such case, it is determined that the scene is an unstructured scene. In some embodiments, for example, planar characteristics are respectively extracted from the two frames of point cloud data. The distances from a plurality of points on the plane in one frame of point cloud data to the plane in the other frame of point cloud data are calculated, and the distances are accumulated. When the accumulated value of the distances is lower than a preset value, it is considered that the matching quality of the two frames of point cloud data fulfills the requirement. The point cloud movement matrix may be calculated on the basis of the matching between the early frame of point cloud data and the late frame of point cloud data. For example, in the tunnel, since there are not enough point cloud characteristics in the tunnel, it is easy to cause a poor matching quality of the point cloud data, and thus, in such case, it is not suitable that the point cloud movement matrix is calculated directly on the basis of the matching on the characteristics between the two frames of point cloud data.

At 204, the computing device 120 determines the point cloud movement matrix between the first frame of point cloud data and the second frame of point cloud data on the basis of the first image 302 and the second image 304. In some embodiments, the image movement matrix between the first image 302 and the second image 304 is first determined. Then, the position and orientation movement matrix between the images and the point cloud data is acquired. Next, the point cloud movement matrix is determined on the basis of the image movement matrix and the position and orientation movement matrix.

In some embodiments, determining the image movement matrix between the first image 302 and the second image 304 as mentioned above includes: extracting matching characteristics in the first image and the second image, the characteristics being, for example, texture characteristics, color characteristics, or edge characteristics; and determining the image movement matrix on the basis of the matching characteristics. In some embodiments, the matching is performed on the characteristics of the first image 302 and the second image 304 using an ICP algorithm. Particularly, a corresponding point set is first established, and then the coordinate transformation matrix between the point clouds is established on the basis of the corresponding point set. Then, the above two steps are iterated until an error function fulfills a preset accuracy requirement.

With regard to the determination of the point cloud movement matrix, in some embodiments, for example, when it is known that the initial position and orientation of the camera is $P_{cam1}$, after the characteristic matching is performed on the first image 302 and the second image 304, the image movement matrix from the first image 302 to the second image 304 is derived as $T_{c1-c2}$. Accordingly, it may be deduced that the position and orientation of the camera at the moment of acquiring the second image is $P_{cam2} = T_{c1-c2} \cdot P_{cam1}$. In some embodiments, the frequency at which the stereo camera acquires the image is, for example, 8 Hz, and the acquisition frequency of the ladar is, for example, 10 Hz. Under the premise of knowing the corresponding positions and orientations of the first image 302 and the second image 304 and the acquisition moments thereof, the linear difference operation is performed on the basis of the relationship between the acquisition moments, and the position and orientation 320 of the first frame of point cloud data acquired at a moment between the acquisition moment of the first image and the acquisition moment of the second image can be determined on the basis of the position and orientation movement matrix between the image and the point cloud data. Similarly, the position and orientation of the second frame of cloud point data may be obtained, and the position and orientation 324 of the $M^{th}$ frame of point cloud data can be obtained. M is a natural number.

With regard to the acquisition of the position and orientation movement matrix mentioned above, in some embodiments, as described above, the position and orientation movement matrix may be manually pre-calibrated, or may be determined during measuring. For example, the position of the ladar for acquiring the point cloud data and the position of the camera for acquiring the image disposed on the acquisition entity are determined. The position and orientation movement matrix is determined on the basis of the position of the ladar and the position of the camera.

At 206, the first frame of point cloud data and the second frame of point cloud data are fused on the basis of the point cloud movement matrix. In some embodiments, as described above, after the positions and orientations 320-324 of the first to $M^{th}$ frames of point cloud data are obtained, or the point cloud movement matrix between every two adjacent frames of point cloud data is obtained, the first frame of point cloud data 330, the second frame of point cloud data 332, and the $M^{th}$ frame of point cloud data 334 are placed into the same coordinate system according to the position and orientation of each frame of point cloud data, to perform a registration on the point cloud data. Then, the point cloud data are fused and stitched together.

In some embodiments, the first frame of point cloud data and the second frame of point cloud data may be fused on the basis of the point cloud movement matrix in a variety of ways. For example, the point cloud frame position and orientation of the first frame of point cloud data and the point cloud frame position and orientation of the second frame of point cloud data in the world coordinate system may be determined. Then, on the basis of the positions of points in the first frame of point cloud data and the positions of the points in the second frame of point cloud data in the local coordinate system of the point cloud data, and the point cloud frame position and orientation, the point positions and orientations of the points in the world coordinate system are determined, and the fusion is performed on the basis of the point positions and orientations. Specifically, on the basis of the positions of the points of each frame of point cloud data in the local coordinate system of the radar, and on the basis of the point cloud frame position and orientation of the each frame of point cloud data in the world coordinate system, the points in the each frame of point cloud data are transferred from the local coordinate system of the ladar to the world coordinate system, thereby achieving the fusion of the point clouds. In some embodiments, the each frame of point cloud data acquired by the acquisition vehicle 110 during moving in the scene 130 and the model for the local three-dimensional scene of the scene 130 are stitched and fused until the whole three-dimensional model of the scene 130 is constructed, to be used for the high-precision map.

By using the method 200 for fusing point cloud data, that is, on the basis of the matching on the characteristics of the images acquired for the scene at the early acquisition moment and the late acquisition moment, the point cloud movement matrix between the early frame of point cloud data and the late frame of point cloud data acquired at the associated moment or the position and orientation data of the point cloud data is calculated, and then the point cloud fusion is performed on the early frame of point cloud data and the late frame of point cloud data. Accordingly, even in the situation where the quality of the positioning signal or the inertial navigation signal is poor and the scene is an unstructured environment, the point cloud fusion can be successfully performed.

In some embodiments, if the positioning signal, the inertial navigation signal or the matching quality of the historical point cloud data satisfies the predetermined condition, for example, the quality of the positioning signal or the inertial navigation signal is good, or the matching quality of the historical point cloud data is good, the point cloud movement matrix between the first frame of point cloud data and the second frame of point cloud data may be determined on the basis of the inertial navigation signal or the matching on the first frame of point cloud data and the second frame of point cloud data. Then, the first frame of point cloud data and the second frame of point cloud data may be fused on the basis of the point cloud movement matrix.

Alternatively, in some embodiments, the position and orientation data of the camera at the corresponding moment may also be updated on the basis of the inertial navigation signal and the point cloud movement matrix.

Figure 4:
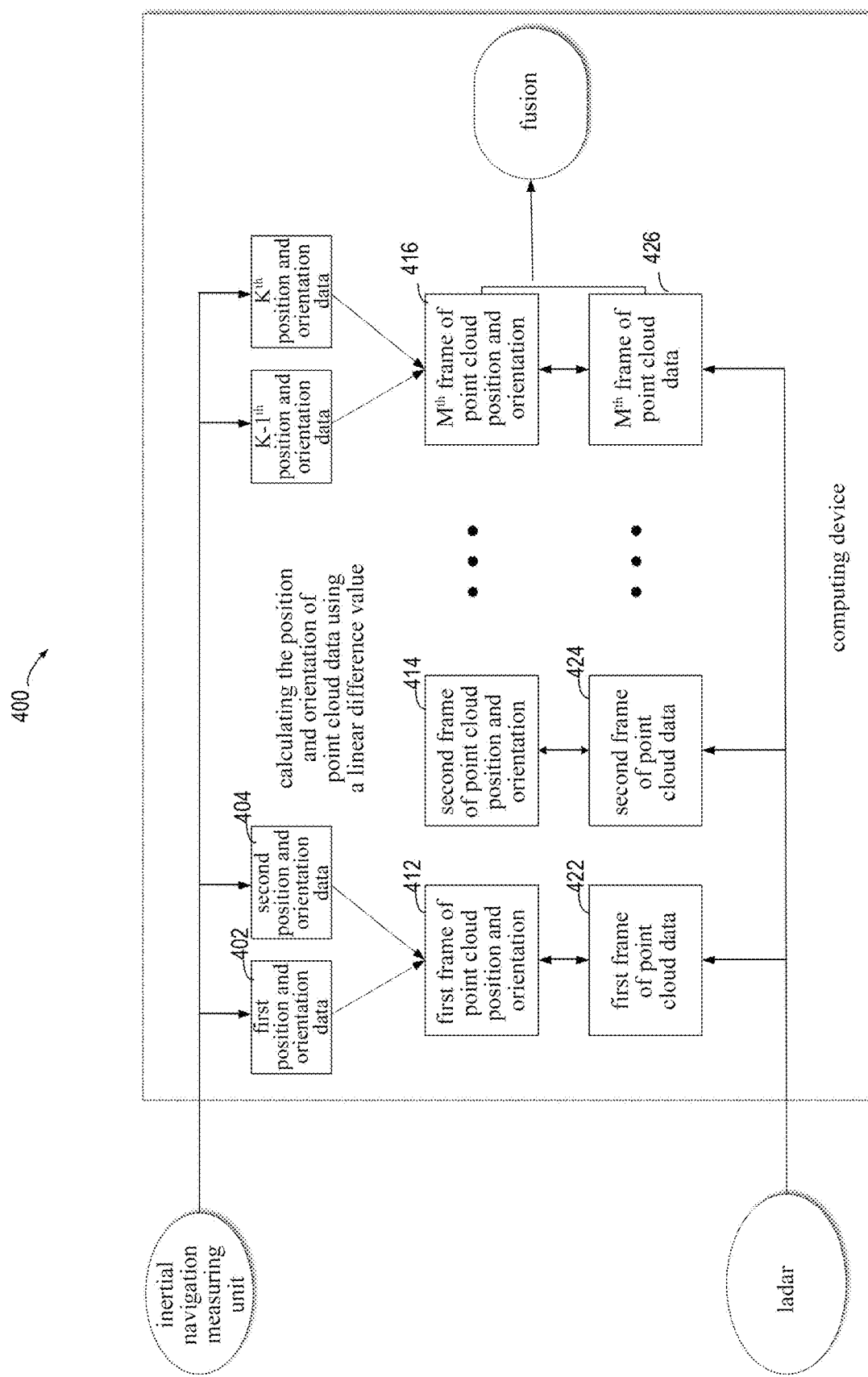
FIG. 4 illustrates a schematic diagram of a process 400 for fusing point cloud data with the aid of the inertial navigation according to some embodiments of the present disclosure.

In some embodiments, as shown in FIG. 4, FIG. 4 illustrates a schematic diagram of a process 400 for fusing point cloud data with the aid of the inertial navigation according to some embodiments of the present disclosure. When the quality of the GPS signal and the quality of the inertial navigation signal are good, for example, higher than a fourth threshold quality, the respective positions and orientations 412 and 414 of the first frame of point cloud data 422 and the second frame of point cloud data 424 or the point cloud movement matrix (not shown) therebetween may be determined by directly using the inertial navigation signal, thereby performing the point cloud fusion. In some embodiments, the frequency of the output signal of the inertial navigation device is, for example, 50 Hz, and the acquisition frequency of the ladar is, for example, 10 Hz. Under the premise of learning the acquisition moment of the first frame of point cloud data 422, the position and orientation data at the latest moment of outputting the inertial navigation signal before the acquisition moment and the moment of outputting the signal (e.g., the first position and orientation data 402), and the position and orientation data at the earliest moment of outputting the inertial navigation signal after the acquisition moment of the first frame of point cloud data 422 and the moment of outputting the signal (e.g., the second position and orientation data 404) are further acquired. According to the relationship between the acquisition moment of the ladar and the moment of outputting the inertial navigation signal, the linear difference operation is performed. The position and orientation 412 of the first frame of point cloud data may be determined on the basis of the position and orientation movement matrix between the inertial navigation signal and the point cloud data. Similarly, the positions and orientations 414-416 of the second to $M^{th}$ frames of point cloud data can be obtained. The fusion is performed on the first to $M^{th}$ frames of point cloud data 422-426 on the basis of the acquired positions and orientations of the point cloud data.

Figure 5:
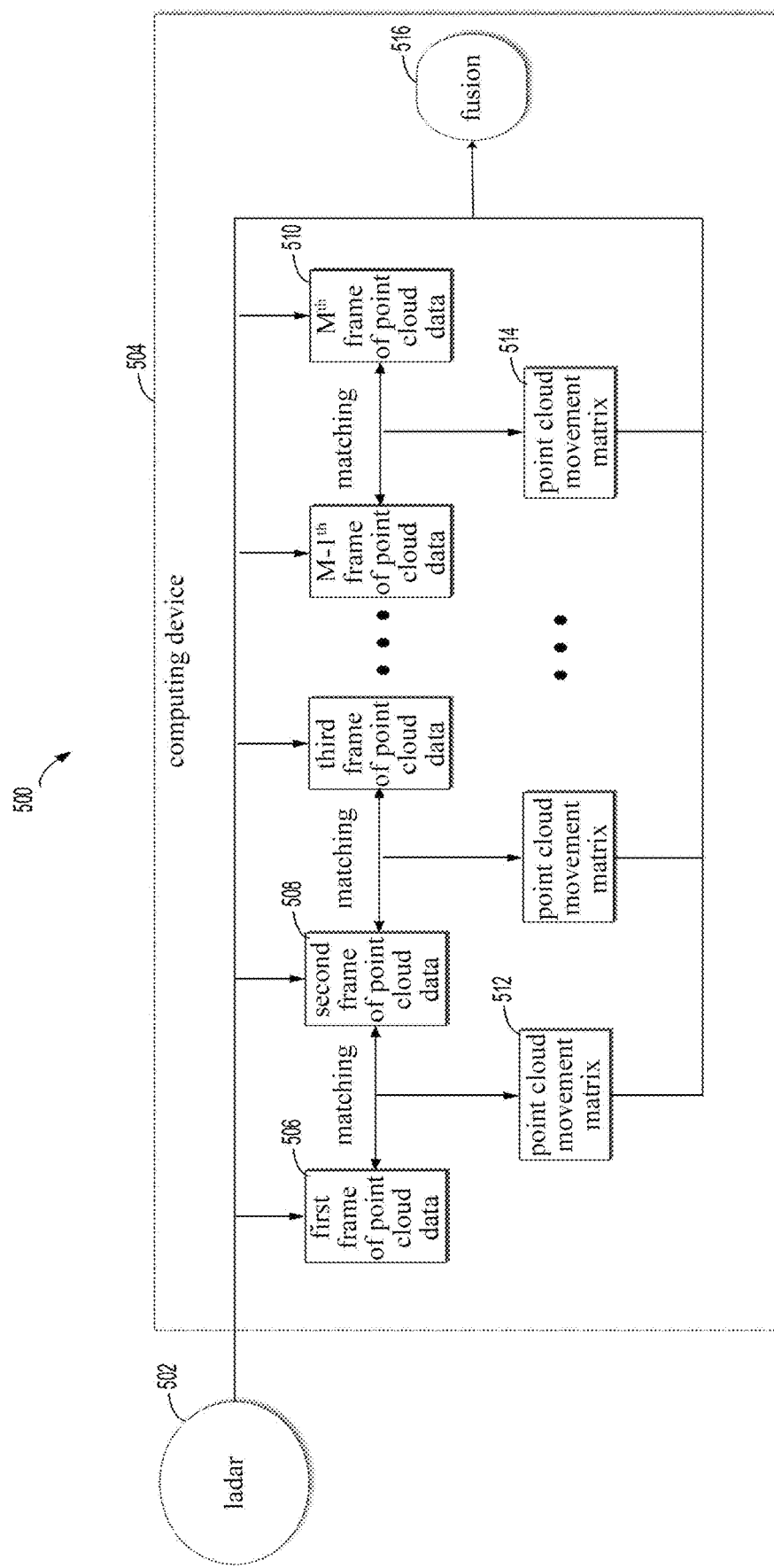
FIG. 5 illustrates a schematic diagram of a process 500 for fusing point cloud data on the basis of point cloud matching according to some embodiments of the present disclosure.

In some embodiments, the matching may be performed directly on the basis of the early frame of point cloud data and the late frame of point cloud data in the plurality of frames of point cloud data acquired by the ladar, to calculate the point cloud movement matrix. As shown in FIG. 5, FIG. 5 illustrates a schematic diagram of a process 500 for fusing the point cloud data on the basis of the matching on the point clouds according to some embodiments of the present disclosure. When the quality of the GPS signal and the quality of the inertial navigation signal are poor while the matching quality of the historical point cloud data satisfies the predetermined condition, i.e., in a structured scene, the point cloud movement matrix 512 between the first and second frames of point cloud data may be determined directly on the basis of the matching between the early frame of point cloud data and the late frame of point cloud data that are acquired by the ladar 502, e.g., the characteristic matching between the first frame of point cloud data 506 and the second frame of point cloud data 508. Similarly, the point cloud movement matrix 514 between the $M-1^{th}$ frame of point cloud data and the $M^{th}$ frame of point cloud data is successively determined. The point cloud fusion is performed on the first to $M^{th}$ frames of point cloud data on the basis of the point cloud transition matrices. M is a natural number. By adopting the above method, when the acquisition vehicle 110 leaves the environment where the point cloud fusion is performed with the aid of images (e.g., the tunnel), in response to the recovery of the quality of the positioning signal, the point cloud fusion is performed by switching from with the aid of images to with the aids of the high-precision position and orientation data such as the inertial navigation data and the laser point cloud data, thereby improving the precision and the effect of the fusion.

Figure 6:
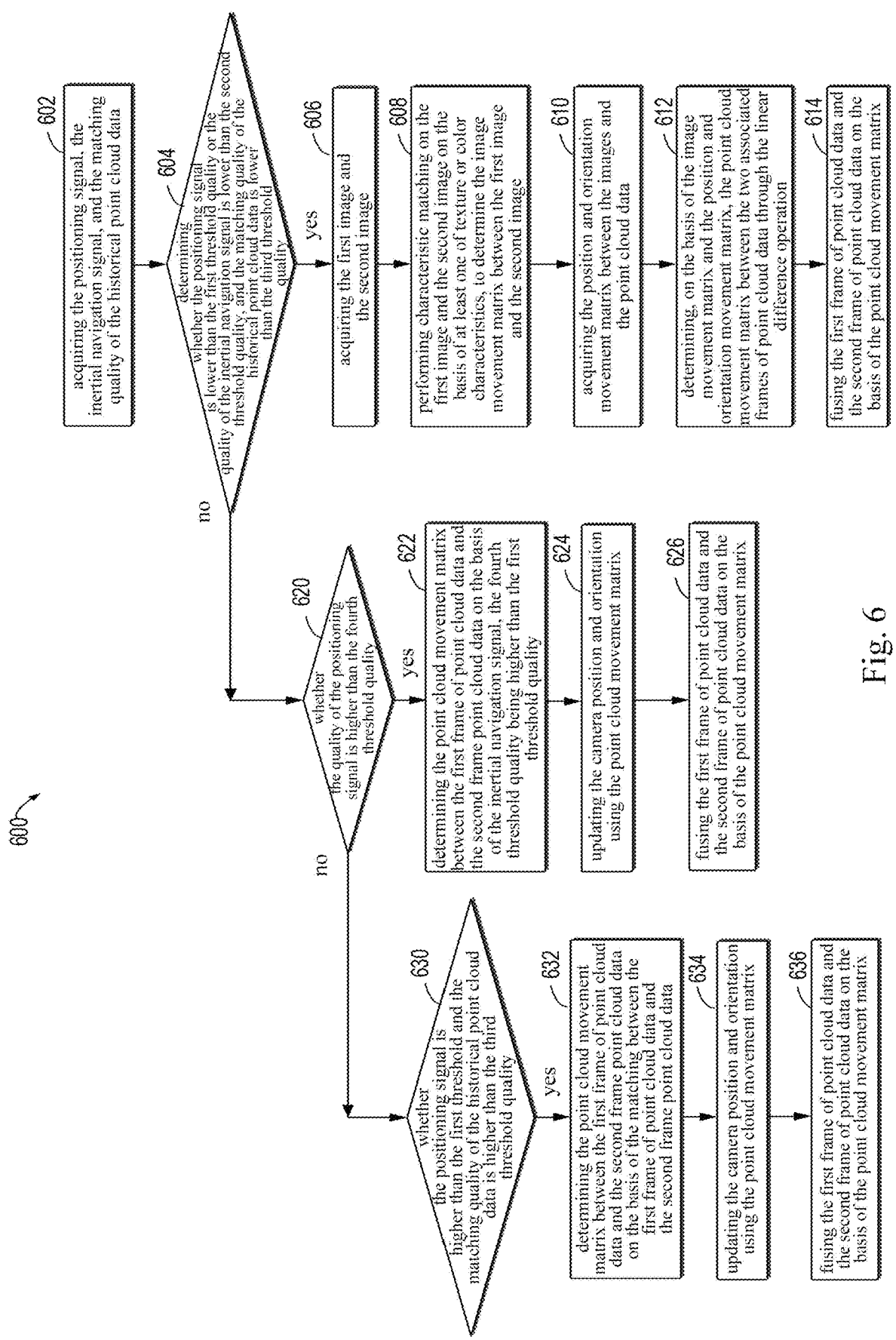
FIG. 6 illustrates a flowchart of a method 600 for fusing point cloud data according to some embodiments of the present disclosure.

FIG. 6 illustrates a flowchart of a method 600 for fusing point cloud data according to some embodiments of the present disclosure. As shown in FIG. 6, at 602, a positioning signal, an inertial navigation signal, and the matching quality of historical point cloud data are acquired. At 604, it is determined that whether the quality of the positioning signal is lower than a first threshold quality or the quality of the inertial navigation signal is lower than a second threshold quality, and the matching quality of the historical point cloud data is lower than a third threshold quality. At 606, if the result of the determining is yes, a first image and a second image are acquired. At 608, characteristic matching is performed on the first image and the second image on the basis of at least one of texture characteristics or color characteristics, to determine the image movement matrix between the first image and the second image. At 610, the position and orientation movement matrix between the images and the point cloud data is acquired. At 612, on the basis of the image movement matrix and the position and orientation movement matrix, the point cloud movement matrix between the two frames of point cloud data that are associated is determined through a linear difference operation. At 614, on the basis of the point cloud movement matrix, the first frame of point cloud data and the second frame of point cloud data are fused. At 620, it is determined that whether the quality of the positioning signal is higher than a fourth threshold quality. At 622, in response to the quality of the positioning signal is higher than a fourth threshold quality, the point cloud movement matrix between the first frame of point cloud data and the second frame point cloud data is determined on the basis of the inertial navigation signal, the fourth threshold quality being higher than the first threshold quality. At 624, a camera position and orientation is updated using the point cloud movement matrix. At 626, the first frame of point cloud data and the second frame of point cloud data are fused on the basis of the determined point cloud movement matrix. At 630, it is determined that whether the positioning signal is higher than the first threshold and the matching quality of the historical point cloud data is higher than the third threshold quality. At 632, if the positioning signal is higher than the first threshold and the matching quality of the historical point cloud data is higher than the third threshold quality, the point cloud movement matrix between the first frame of point cloud data and the second frame point cloud data is determined on the basis of the matching between the first frame of point cloud data and the second frame point cloud data. At 634, the camera position and orientation is updated using the point cloud movement matrix. At 636, the first frame of point cloud data and the second frame of point cloud data are fused on the basis of the determined point cloud movement matrix.

By adopting the above method 600, when the quality of the positioning signal (e.g., GPS signal) is good, the position and orientation of each frame of point cloud data is accurately determined on the basis of the inertial navigation data, thereby realizing a high-precision point cloud fusion. At the same time, when the quality of the GPS signal is mediocre but the scene is the structured scene, the point cloud movement matrix is directly determined on the basis of the characteristic matching between the early frame of point cloud data and the late frame of point cloud data, which avoids the influence of the mediocre quality of the GPS signal or inertial navigation signal on the point cloud fusion effect. In addition, when the quality of the GPS signal is poor and the scene is an unstructured scene, the point cloud movement matrix or position and orientation of the corresponding frame of point cloud data is determined on the basis of the characteristic matching between the early frame of image and the late frame of image, so that the point cloud fusion can be successfully performed in the situation where the quality of the GPS signal is poor, or even there is no GPS signal, and in the unstructured scene where the point cloud characteristic is not clear.

Figure 7:
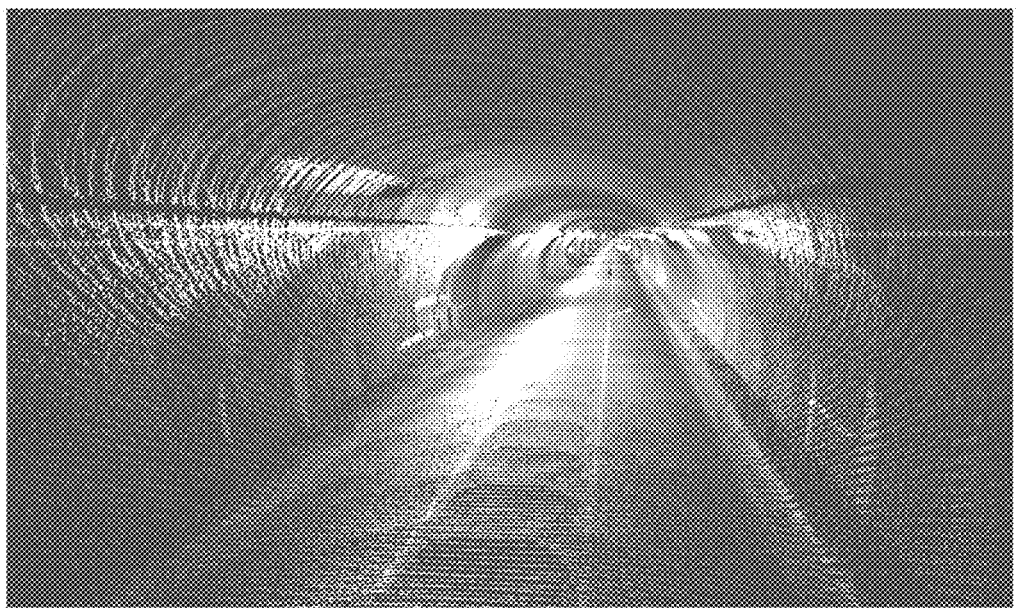
FIG. 7 illustrates an effect drawing of a three-dimensional model of a tunnel constructed on the basis of the method for fusing point cloud data according to some embodiments of the present disclosure.

FIG. 7 illustrates an effect drawing of a three-dimensional model of a tunnel constructed by the method for fusing point cloud data according to some embodiments of the present disclosure. It may be seen from the fusion effect of the three-dimensional model that the point cloud data is successfully fused even in the tunnel environment.

Figure 8:
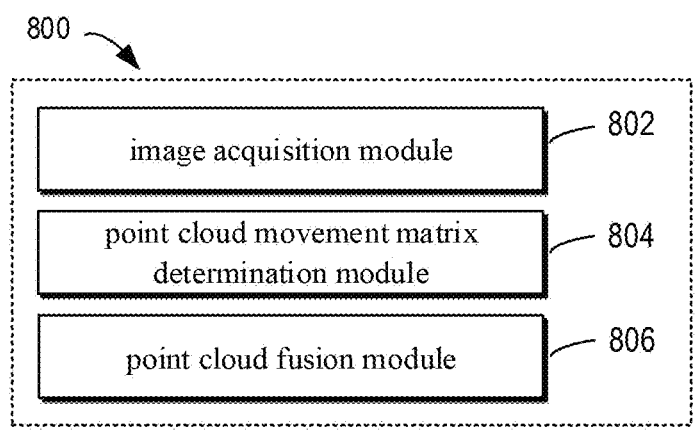
FIG. 8 illustrates a schematic block diagram of an apparatus 800 for fusing point cloud data according to some embodiments of the present disclosure.

FIG. 8 illustrates a schematic block diagram of an apparatus 800 for fusing point cloud data according to some embodiments of the present disclosure. As shown in FIG. 8, the apparatus 800 includes: an image acquisition module 802, configured to acquire a first image and a second image, the first image and the second image being respectively associated with a first frame of point cloud data and a second frame of point cloud data acquired for a given scene; a point cloud movement matrix determination module 804, configured to determine a point cloud movement matrix between the first frame of point cloud data and the second frame of point cloud data on the basis of the first image and the second image; and a point cloud fusion module 806, configured to fuse the first frame of point cloud data with the second frame of point cloud data on the basis of the point cloud movement matrix.

In some embodiments, the image acquisition module includes: an associated signal acquisition module, configured to acquire information associated with the first frame of point cloud data and the second frame of point cloud data, wherein the information includes at least one of a positioning signal, an inertial navigation signal, or a matching quality of historical point cloud data; and a condition module, configured to acquire, in response to the information not satisfying a predetermined condition, the first image and the second image.

In some embodiments, the condition module includes: a threshold module, configured to acquire the first image and the second image, in response to a quality of the positioning signal being lower than a first threshold quality or the quality of the inertial navigation signal being lower than a second threshold quality, and the matching quality of the historical point cloud data being lower than a third threshold quality.

In some embodiments, the apparatus 800 further includes: an inertial navigation or point cloud matching condition module, configured to determine, in response to the information satisfying the predetermined condition, the point cloud movement matrix between the first frame of point cloud data and the second frame of point cloud data on the basis of at least one of: the inertial navigation signal, or matching between the first frame of point cloud data and the second frame of point cloud data; and a point cloud fusion module, configured to fuse the first frame of point cloud data with the second frame of point cloud data on the basis of the point cloud movement matrix.

In some embodiments, the movement matrix determination module includes: an image movement matrix determination module, configured to determine an image movement matrix between the first image and the second image; a position and orientation movement matrix acquisition module, configured to acquire a position and orientation movement matrix between the images and the point cloud data; and a point cloud movement matrix determination module, configured to determine the point cloud movement matrix on the basis of the image movement matrix and the position and orientation movement matrix.

In some embodiments, the image movement matrix determination module includes: a characteristic extraction module, configured to extract matching characteristics in the first image and the second image; and an image movement matrix module, configured to determine the image movement matrix on the basis of the matching characteristics.

In some embodiments, the position and orientation movement matrix acquisition module includes: a position determination module, configured to determine a position of a ladar for acquiring the point cloud data disposed on an acquisition entity and the position of a camera for acquiring the images; and a position and orientation movement matrix determination module, configured to determine the position and orientation movement matrix on the basis of the position of the ladar and the position of the camera.

In some embodiments, the point cloud fusion module includes: a point cloud frame position and orientation determination module, configured to determine point cloud frame positions and orientations of the first frame of point cloud data and the second frame of point cloud data in a world coordinate system; a point position and orientation determination module, configured to determine, on the basis of positions of points in the first frame of point cloud data and the second frame of point cloud data in a local coordinate system of the point cloud data and the point cloud frame positions and orientations, point positions and orientations of the points in the world coordinate system; and a fusion module, configured to fuse on the basis of the point positions and orientations.

Figure 9:
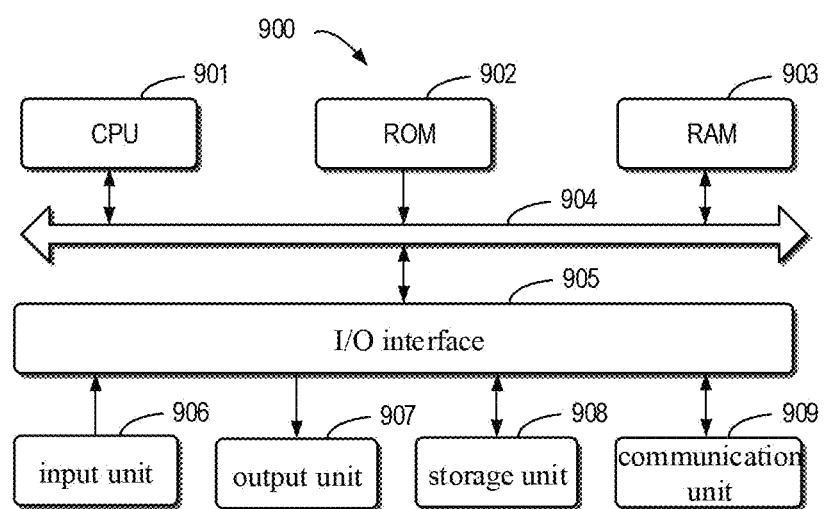
FIG. 9 illustrates a schematic block diagram of an illustrative device 900 which may be used to implement the embodiments of the present disclosure.

FIG. 9 shows a schematic block diagram of an illustrative device 900 capable of implementing various embodiments of the present disclosure. The device 900 may be used to implement the apparatus 120 in FIG. 1. As shown in the figure, the device 900 includes a central processing unit (CPU) 901 that may perform various appropriate actions and processing in accordance with computer program instructions stored in a read only memory (ROM) 902 or computer program instructions loaded into a random access memory (RAM) 903 from a storage unit 908. In the RAM 903, various programs and data required for the operation of the device 900 may also be stored. The CPU 901, the ROM 902, and the RAM 903 are connected to each other through a bus 904. An input/output (I/O) interface 905 is also coupled to the bus 904.

A plurality of components in the device 900 are coupled to the I/O interface 905, including: an input unit 906, such as a keyboard or a mouse; an output unit 907, such as various types of displays, or speakers; the storage unit 908, such as a disk or an optical disk; and a communication unit 909 such as a network card, a modem, or a wireless communication transceiver. The communication unit 909 allows the device 900 to exchange information/data with other devices over a computer network such as the Internet and/or various telecommunication networks.

The processing unit 901 performs the various methods and processes described above, such as the process 200 and/or 600, and the process 300, 400, and/or 500. For example, in some embodiments, the process 200 and/or 600, and the process 300, 400, and/or 500 may be implemented as a computer software program that is tangibly embodied in a machine readable medium, such as the storage unit 908. In some embodiments, some or all of the computer programs may be loaded and/or installed onto the device 900 via the ROM 902 and/or the communication unit 909. When a computer program is loaded into the RAM 903 and executed by the CPU 901, one or more of the actions or steps of the process 200 and/or 600, and the process 300, 400, and/or 500 described above may be performed. Alternatively, in other embodiments, the CPU 901 may be configured to perform the process 200 and/or 600, and the process 300, 400, and/or 500 by any other suitable means (e.g., by means of firmware).

The functions described herein above may be performed, at least in part, by one or more hardware logic components. For example, and without limitation, illustrative types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of some embodiments of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of some embodiments of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection on the basis of one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions are described in a specific order, this should not be understood that such actions are required to be performed in the specific order shown or in sequential order, or all illustrated actions should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely illustrative forms of implementing the claims.

What is claimed is:

1. A method for fusing point cloud data, comprising:
   acquiring a first image and a second image, the first image and the second image being respectively associated with a first frame of point cloud data and a second frame of point cloud data acquired for a given scene;
   determining a point cloud movement matrix between the first frame of point cloud data and the second frame of point cloud data on the basis of the first image and the second image; and
   fusing the first frame of point cloud data with the second frame of point cloud data on the basis of the point cloud movement matrix,
   wherein the determining a point cloud movement matrix between the first frame of point cloud data and the second frame of point cloud data comprises:
   determining an image movement matrix between the first image and the second image;
   acquiring a position and orientation movement matrix between the images and the point cloud data; and
   determining the point cloud movement matrix on the basis of the image movement matrix and the position and orientation movement matrix,
   wherein the method is performed by at least one processor.

2. The method according to claim 1, wherein the acquiring a first image and a second image comprises:
   acquiring information associated with the first frame of point cloud data and the second frame of point cloud data, wherein the information includes at least one of a positioning signal, an inertial navigation signal, or a matching quality of historical point cloud data; and
   acquiring, in response to the information not satisfying a predetermined condition, the first image and the second image.

3. The method according to claim 2, wherein the acquiring, in response to the information not satisfying a predetermined condition, the first image and the second image comprises:
   acquiring the first image and the second image, in response to a quality of the positioning signal being lower than a first threshold quality or the quality of the inertial navigation signal being lower than a second threshold quality, and the matching quality of the historical point cloud data being lower than a third threshold quality.

4. The method according to claim 2, further comprising:
   determining, in response to the information satisfying the predetermined condition, the point cloud movement matrix between the first frame of point cloud data and the second frame of point cloud data on the basis of at least one of:
   the inertial navigation signal, or
   matching between the first frame of point cloud data and the second frame of point cloud data; and
   fusing the first frame of point cloud data with the second frame of point cloud data on the basis of the point cloud movement matrix.

5. The method according to claim 1, wherein the determining an image movement matrix between the first image and the second image comprises:
   extracting matching characteristics in the first image and the second image; and
   determining the image movement matrix on the basis of the matching characteristics.

6. The method according to claim 1, wherein the acquiring a position and orientation movement matrix comprises:
   determining a position of a ladar for acquiring the point cloud data disposed on an acquisition entity and the position of a camera for acquiring the images; and
   determining the position and orientation movement matrix on the basis of the position of the ladar and the position of the camera.

7. The method according to claim 1, wherein the fusing the first frame of point cloud data with the second frame of point cloud data on the basis of the point cloud movement matrix comprises:
   determining point cloud frame positions and orientations of the first frame of point cloud data and the second frame of point cloud data in a world coordinate system;
   determining, on the basis of positions of points in the first frame of point cloud data and the second frame of point cloud data in a local coordinate system of the point cloud data and the point cloud frame positions and orientations, point positions and orientations of the points in the world coordinate system; and
   fusing on the basis of the point positions and orientations.

8. An apparatus for fusing point cloud data, comprising:
   at least one processor; and
   a memory storing instructions, the instructions when executed by the at least one processor, cause the at least one processor to perform operations, the operations comprising:
   acquiring a first image and a second image, the first image and the second image being respectively associated with a first frame of point cloud data and a second frame of point cloud data acquired for a given scene;
   determining a point cloud movement matrix between the first frame of point cloud data and the second frame of point cloud data on the basis of the first image and the second image; and
   fusing the first frame of point cloud data with the second frame of point cloud data on the basis of the point cloud movement matrix,
   wherein the determining a point cloud movement matrix between the first frame of point cloud data and the second frame of point cloud data comprises:
   determining an image movement matrix between the first image and the second image;
   acquiring a position and orientation movement matrix between the images and the point cloud data; and
   determining the point cloud movement matrix on the basis of the image movement matrix and the position and orientation movement matrix.

9. The apparatus according to claim 8, wherein the acquiring a first image and a second image comprises:
   acquiring information associated with the first frame of point cloud data and the second frame of point cloud data, wherein the information includes at least one of a positioning signal, an inertial navigation signal, or a matching quality of historical point cloud data; and
   acquiring, in response to the information not satisfying a predetermined condition, the first image and the second image.

10. The apparatus according to claim 9, wherein the acquiring, in response to the information not satisfying a predetermined condition, the first image and the second image comprises:
    acquiring the first image and the second image, in response to a quality of the positioning signal being lower than a first threshold quality or the quality of the inertial navigation signal being lower than a second threshold quality, and the matching quality of the historical point cloud data being lower than a third threshold quality.

11. The apparatus according to claim 8, wherein the operations further comprise:
  determining, in response to the information satisfying the predetermined condition, the point cloud movement matrix between the first frame of point cloud data and the second frame of point cloud data on the basis of at least one of:
  the inertial navigation signal, or
  matching between the first frame of point cloud data and the second frame of point cloud data; and
  fusing the first frame of point cloud data with the second frame of point cloud data on the basis of the point cloud movement matrix.

12. The apparatus according to claim 8, wherein the determining an image movement matrix between the first image and the second image comprises:
  extracting matching characteristics in the first image and the second image; and
  determining the image movement matrix on the basis of the matching characteristics.

13. The apparatus according to claim 8, wherein the acquiring a position and orientation movement matrix comprises:
  determining a position of a ladar for acquiring the point cloud data disposed on an acquisition entity and the position of a camera for acquiring the images; and
  determining the position and orientation movement matrix on the basis of the position of the ladar and the position of the camera.

14. The apparatus according to claim 8, wherein the fusing the first frame of point cloud data with the second frame of point cloud data on the basis of the point cloud movement matrix comprises:
  determining point cloud frame positions and orientations of the first frame of point cloud data and the second frame of point cloud data in a world coordinate system;
  determining, on the basis of positions of points in the first frame of point cloud data and the second frame of point cloud data in a local coordinate system of the point cloud data and the point cloud frame positions and orientations, point positions and orientations of the points in the world coordinate system; and
  fusing on the basis of the point positions and orientations.

15. A non-transitory computer-readable storage medium storing a computer program, the computer program when executed by one or more processors, causes the one or more processors to perform operations, the operations comprising:
  acquiring a first image and a second image, the first image and the second image being respectively associated with a first frame of point cloud data and a second frame of point cloud data acquired for a given scene;
  determining a point cloud movement matrix between the first frame of point cloud data and the second frame of point cloud data on the basis of the first image and the second image; and
  fusing the first frame of point cloud data with the second frame of point cloud data on the basis of the point cloud movement matrix,
  wherein the determining a point cloud movement matrix between the first frame of point cloud data and the second frame of point cloud data comprises:
  determining an image movement matrix between the first image and the second image;
  acquiring a position and orientation movement matrix between the images and the point cloud data; and
  determining the point cloud movement matrix on the basis of the image movement matrix and the position and orientation movement matrix.

* * * * *